United States Patent
Castrejon, III et al.

(10) Patent No.: US 11,985,146 B2
(45) Date of Patent: May 14, 2024

(54) SYSTEM AND METHODS FOR PROACTIVE PROTECTION AGAINST MALFEASANT DATA COLLECTION

(71) Applicant: BANK OF AMERICA CORPORATION, Charlotte, NC (US)

(72) Inventors: Tomas M. Castrejon, III, Fort Mill, SC (US); Peter Kurrasch, Palatine, IL (US); John Raymond Omernik, Wittenberg, WI (US); Richard Seymour Scot, Huntersville, NC (US); Kevin Patrick Thomsen, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 233 days.

(21) Appl. No.: 17/489,555

(22) Filed: Sep. 29, 2021

(65) Prior Publication Data
US 2023/0101995 A1 Mar. 30, 2023

(51) Int. Cl.
*H04L 29/06* (2006.01)
*H04L 9/40* (2022.01)

(52) U.S. Cl.
CPC ...... *H04L 63/1416* (2013.01); *H04L 63/0236* (2013.01); *H04L 63/0876* (2013.01); *H04L 63/1466* (2013.01); *H04L 63/20* (2013.01)

(58) Field of Classification Search
CPC ............ H04L 63/0236; H04L 63/0876; H04L 63/1466; H04L 63/20
See application file for complete search history.

(56) References Cited

U.S. PATENT DOCUMENTS

| | | | |
|---|---|---|---|
| 4,905,231 A * | 2/1990 | Leung | H04L 12/56 370/400 |
| 7,925,550 B2 * | 4/2011 | Kataria | G06Q 10/087 705/28 |
| 7,930,754 B2 | 4/2011 | Goldberg et al. | |
| 7,954,143 B2 * | 5/2011 | Aaron | H04L 63/0227 726/1 |
| 7,984,500 B1 | 7/2011 | Khanna et al. | |
| 8,281,114 B2 | 10/2012 | Linetsky | |
| 8,577,042 B2 | 11/2013 | Worthy | |
| 8,880,435 B1 | 11/2014 | Catlett et al. | |
| 9,298,890 B2 | 3/2016 | Bajenov et al. | |
| 9,692,791 B1 * | 6/2017 | Mishra | H04L 63/1425 |
| 9,736,178 B1 | 8/2017 | Ashley | |
| 9,942,220 B2 | 4/2018 | Bajenov et al. | |
| 10,162,962 B1 * | 12/2018 | Glick | G06F 21/6209 |
| 10,331,473 B2 | 6/2019 | Nenov | |
| 10,469,523 B2 | 11/2019 | Shulman et al. | |

(Continued)

*Primary Examiner* — Vance M Little
(74) *Attorney, Agent, or Firm* — Moore & Van Allen PLLC; Nicholas C. Russell (57) ABSTRACT

Embodiments of the invention are directed to systems, methods, and computer program products for providing intelligent proactive identification of, and protection against, malfeasant data collection, user device control, or user account access. The invention utilizes a continuous data analysis technique in order to recognize patterns in device data and network communications indicative of remote device control requests, and responds to these identified data points by implemented an automated solution to protect users against unauthorized access of their devices or accounts.

17 Claims, 4 Drawing Sheets

(56) References Cited

U.S. PATENT DOCUMENTS

| | | |
|---|---|---|
| 10,530,782 B2 | 1/2020 | Brockhuus et al. |
| 10,965,742 B2 | 3/2021 | Dennis et al. |
| 11,032,318 B2 | 6/2021 | Dods |
| 2005/0286722 A1 | 12/2005 | Aboba et al. |
| 2006/0106675 A1* | 5/2006 | Cohen ................ G06Q 30/0601 705/37 |
| 2006/0107055 A1 | 5/2006 | Panwar et al. |
| 2010/0195825 A1 | 8/2010 | Cini |
| 2011/0145910 A1 | 6/2011 | Barnes et al. |
| 2012/0278889 A1* | 11/2012 | El-Moussa .......... H04L 63/1475 726/23 |
| 2012/0297461 A1 | 11/2012 | Pineau |
| 2014/0229614 A1* | 8/2014 | Aggarwal ........... H04L 65/1063 709/224 |
| 2016/0127417 A1* | 5/2016 | Janssen ............... H04L 63/1433 726/1 |
| 2017/0214694 A1* | 7/2017 | Yan ..................... G06F 9/45558 |
| 2018/0039952 A1* | 2/2018 | Dintenfass ........ G06F 16/24565 |
| 2018/0309786 A1 | 10/2018 | Apelewicz et al. |
| 2019/0104153 A1 | 4/2019 | Grady et al. |
| 2019/0149561 A1* | 5/2019 | Maeda ................ B60R 16/0232 726/23 |

\* cited by examiner

SYSTEM AND METHODS FOR PROACTIVE PROTECTION AGAINST MALFEASANT DATA COLLECTION

FIELD

The present invention generally relates to the field of proactive detection of unauthorized device access, as well as systems and methods for responding to identified scenarios of unauthorized or attempted unauthorized device or account access using a multi-channel approach.

BACKGROUND

With the increased use of remote services for management of resources and sensitive data, there is a need for systems and methods which aid in identifying unauthorized or malfeasant requests for sensitive information in order to proactively guard against these scenarios and alert affected users.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent system and methods for identifying and proactively responding to or thwarting unauthorized attempts to access devices, accounts, or systems. In some embodiments, the systems and methods described herein utilize a pattern recognition engine designed to analyze and detect identifying characteristics of malfeasant methods for account access or information gathering. For instance, in some embodiments, systems and methods described herein may log and analyze a database of metadata information including device characteristics, communication information, network addresses, application or program usage, communication phrasing, or the like, in order to identify when a user may be the subject of a malfeasant request to provide remote-access to an unauthorized third party, or a third party posing as a legitimate support service provider. In this way, the system may provide the end user with a proactive alert, message, or the like, in order to signal to the user that there is a high likelihood they are currently being asked to provide access to a potentially unauthorized party. In some embodiments, the system may additionally be enabled to actively thwart access to the user device in certain circumstances where there is a high degree of confidence that the user has authorized remote access to a known malfeasant actor. For instance, remote sessions on a user device may be blocked from executing successfully even if a user initially grants access to the third party to remotely control their device or accounts. In some embodiments, active blocking of remote device sessions may be executed in a temporary fashion while the user is alerted of the potential issue, and the user may be given an option to proceed even in lieu of the warning or high degree of confidence, given that there may be instances where the user may need to override the system's determination. IN any case, the systems and methods described herein provide a seamless and automated solution for proactively identifying unauthorized requests for remote access in order to guard against malfeasant data collection, device control, and account access.

The invention utilizes a process for machine learning detection by continuously analyzing received data in order to identify relevant patterns based on known scenarios that involved unauthorized remote access or remote access request(s). By analyzing and identifying how changing data over time affects the output of machine learning models, the system is able to project and account for data fluctuations in the future, essentially anticipating and proactively adapting for variable data input to improve the integrity and accuracy of machine learning models.

With the understanding that it may be a common technique for unauthorized users to emulate a security issue or account vulnerability and "proactively reach out" to one or more users in order to gain unauthorized access via remote device control or account access, the present invention is designed to identify and proactively secure against such methods. In some embodiments, a malfeasant or unauthorized user will ask the user to provide sensitive information so that they can address a fabricated issue. In some instances, the unauthorized user will ask the user to allow the unauthorized or malfeasant party to create a remote session on their device and allow control of their machine via remote session(s). The present invention specifically focuses on ways in which to identify that a user is being solicited using one of these methods and reach out to the user to notify them that they may be in the process of being compromised, depending on the actions they choose to take and the permissions they grant to third parties. The system analyzes incoming network traffic in order to recognize patterns that reveal when a malfeasant actor is logging in from a customer device or computer remotely, and proactively blocks these attempts, locks the user's account, notifies the user of the activity, or any combination of these approaches. The system will react immediately as the malfeasant actor initiates a remote session by capturing device ID, IP address, browser information, or the like, and analyzing this information in order to deduce information patterns which can be used to further indicate or identify these unauthorized remote sessions.

Embodiments of the invention relate to systems, methods, and computer program products for dynamic feedback on resource usage, the system generally comprising the following steps: continuously monitoring network activity to and from a user device and user device communication data; analyzing network activity to and from the user device and user device communication data and identifying one or more requests or indications of user device access or user device remote control; transmitting a proactive alert to the user device via one or more communication channels; automatically implementing a temporary restriction on user device network connectivity or service access capability; and receiving an affirmation or exception request from the user device.

In some embodiments, the invention is further configured for, based on identifying one or more requests or indications of user device access or user device remote control, analyzing communications received by the user device; and identifying one or more corroborating communications related to the identified one or more requests or indications of user device access or user device remote control.

In some embodiments, the proactive alert to the user device is transmitted using the same communication channel as the one or more corroborating communications related to the identified one or more requests or indications of user device access or user device remote control.

In some embodiments, the one or more requests or indications of user device access or user device remote control are identified based on analyzing TCP/IP port number of network traffic to or from the user device.

In some embodiments, the invention is further configured for identifying the one or more requests or indications of user device access or user device remote control by identifying one or more user accounts or secure applications accessed from an unrecognized device or network address In some embodiments, the invention is further configured for transmitting the exception request automatically to a network administrator prior to reversing or removing the temporary restriction.

In some embodiments, the proactive alert is transmitted to the user device using more than one communication channel at a time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for use of a machine learning engine to intelligently identify patterns in received resource transaction data. The machine learning engine may be used to analyze historical data in comparison to real-time received transaction data in order to identify transaction patterns or potential issues. The machine learning engine may also be used to generate intelligent aggregation of similar data based on metadata comparison resource transaction characteristics, which in some cases may be used to generate a database visualization of identified patterns similarities.

Figure 1:
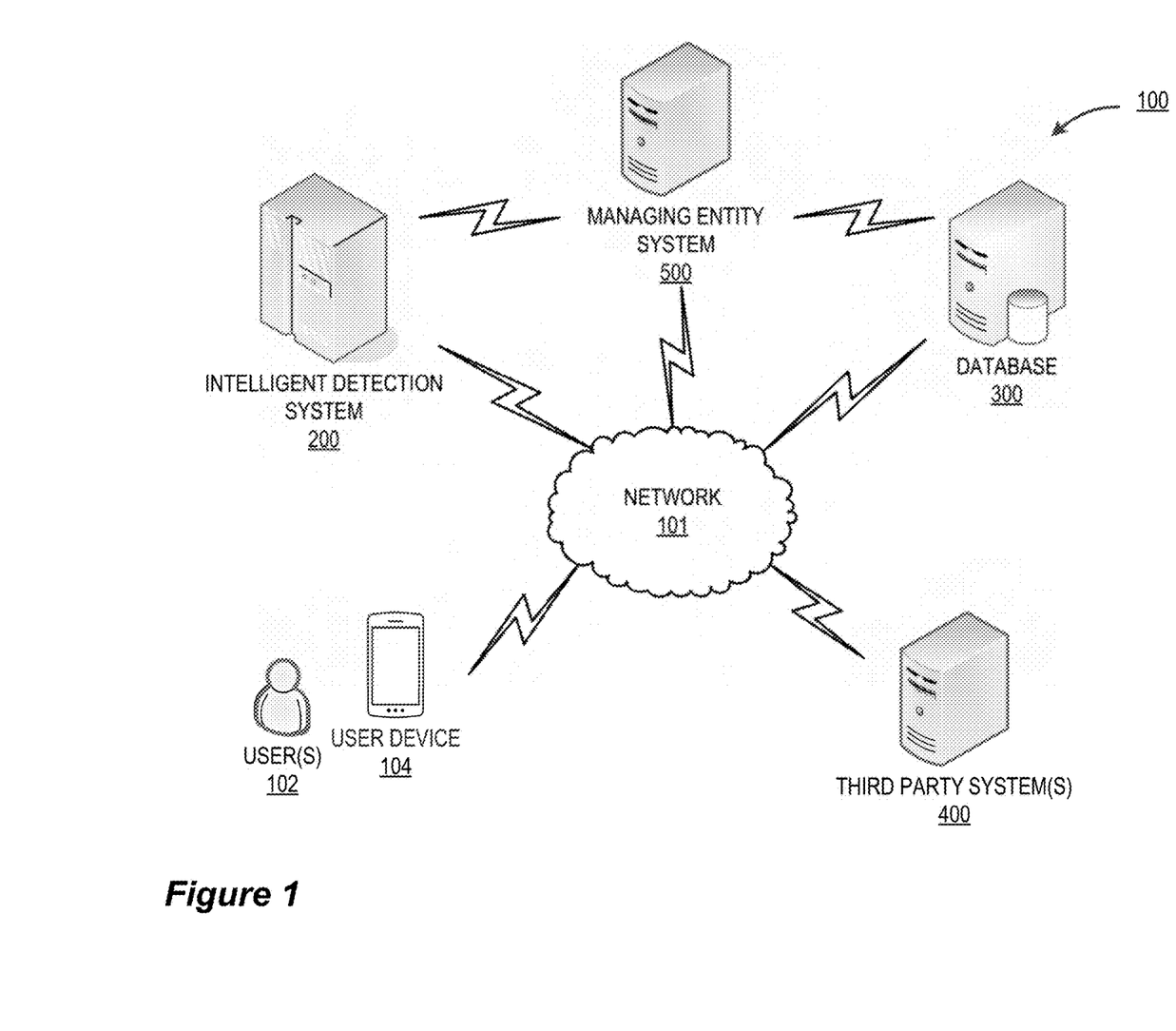
FIG. 1 illustrates a system environment for the proactive protection system, in accordance with one embodiment of the present disclosure.

FIG. 1 illustrates an operating environment for proactive protection against malfeasant data collection, in accordance with one embodiment of the present disclosure. As illustrated, the operating environment 100 may comprise a user 102 and/or a user device 104 in operative communication with one or more third party systems 400 (e.g., web site hosts, registry systems, financial entities, third party entity systems, or the like). The operative communication may occur via a network 101 as depicted, or the user 102 may be physically present at a location separate from the various systems described, utilizing the systems remotely. The operating environment also includes a managing entity system 500, intelligent detection system 200, a database 300, and/or other systems/devices not illustrated herein and connected via a network 101. As such, the user 102 may request information from or utilize the services of the intelligent detection system 200, or the third party system 400 by establishing operative communication channels between the user device 104, the managing entity system 500, and the third party system 400 via a network 101.

Typically, the intelligent detection system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (e.g., a smart phone or mobile phone, or the like), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain resource account data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the intelligent detection system 200 and database 300 via a private communication channel. The private communication channel may be via a network 101 or the intelligent detection system 200 and database 300 may be fully integrated within the managing entity system 500, such as a virtual private network (VPN), or over a secure socket layer (SSL).

The managing entity system 500 may communicate with the intelligent detection system 200 in order to transmit data associated with observed resource transaction or account data by or via a plurality of third party systems 400. In some embodiments, the managing entity system 500 may utilize the features and functions of the intelligent detection system 200 to initialize advisory measures in response to identifying user interests or needs. In other embodiments, the managing entity and/or the one or more third party systems 400 may utilize the intelligent information sharing system to react to identified trends, patterns, or potential issues.

Figure 2:
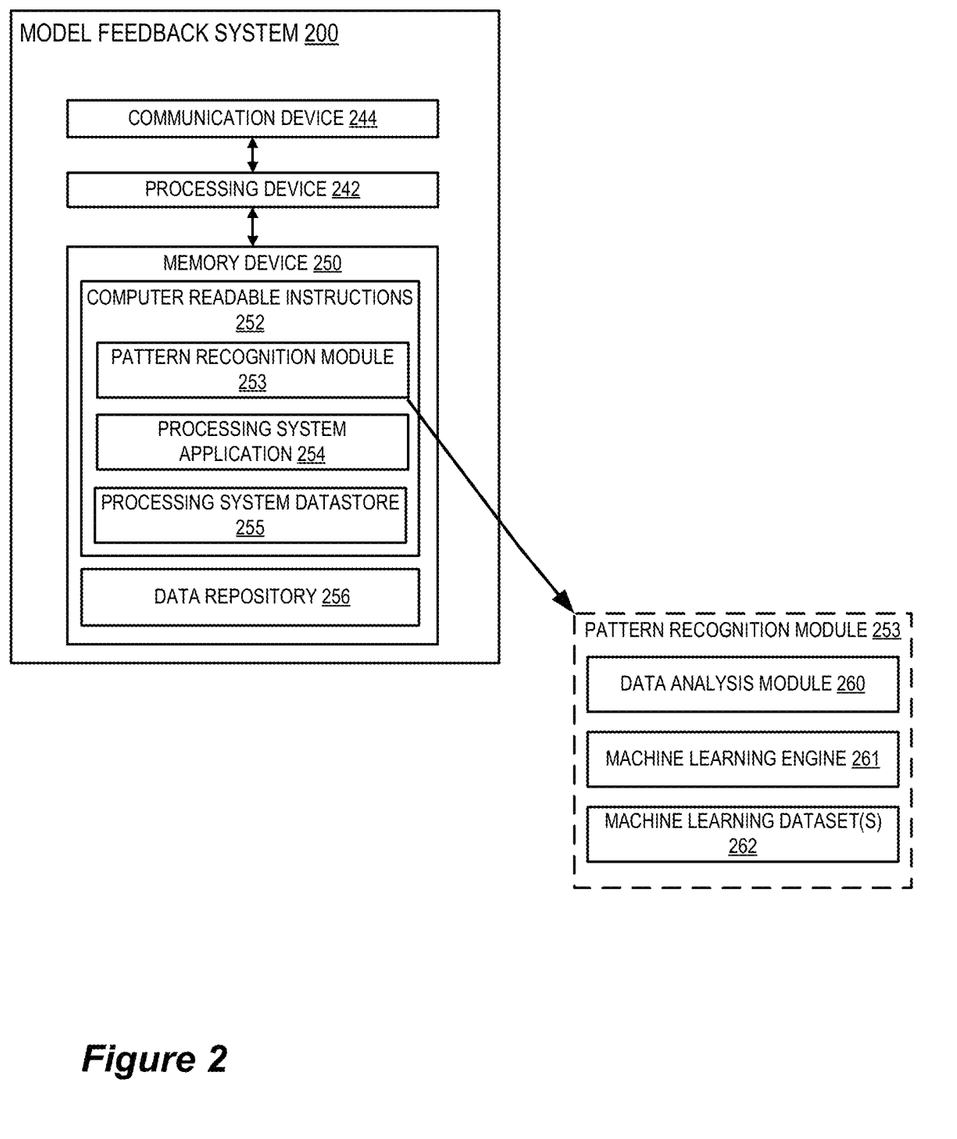
FIG. 2 is a block diagram illustrating components of the intelligent detection system, in accordance with one embodiment of the present disclosure.

FIG. 2 illustrates a block diagram of the intelligent detection system 200 associated with the operating environment 100, in accordance with embodiments of the present invention. As illustrated in FIG. 2, the intelligent detection system 200 may include a communication device 244, a processing device 242, and a memory device 250 having a pattern recognition module 253, a processing system application 254 and a processing system datastore 255 stored therein. As shown, the processing device 242 is operatively connected to and is configured to control and cause the communication device 244, and the memory device 250 to perform one or more functions. In some embodiments, the pattern recognition module 253 and/or the processing system application 254 comprises computer readable instructions that when executed by the processing device 242 cause the processing device 242 to perform one or more functions and/or transmit control instructions to the database 300, the managing entity system 500, or the communication device 244. It will be understood that the pattern recognition module 253 or the processing system application 254 may be executable to initiate, perform, complete, and/or facilitate one or more portions of any embodiments described and/or contemplated herein. The pattern recognition module 253 may comprise executable instructions associated with data processing and analysis and may be embodied within the processing system application 254 in some instances. The intelligent detection system 200 may be owned by, operated by and/or affiliated with the same managing entity that owns or operates the managing entity system 500. In some embodiments, the intelligent detection system 200 is fully integrated within the managing entity system 500.

The pattern recognition module 253 may further comprise a data analysis module 260, a machine learning engine 261, and a machine learning dataset(s) 262. The data analysis module 260 may store instructions and/or data that may cause or enable the intelligent detection system 200 to receive, store, and/or analyze data received by the managing entity system 500 or the database 300, as well as generate information and transmit responsive data to the managing entity system 500 in response to one or more requests or via a real-time data stream between the intelligent detection system 200 and the managing entity system 500. The data analysis module may pre-process data before it is fed to the machine learning engine 261. In this way, the intelligent detection system 200 may exercise control over relevance or weighting of certain data features, which in some embodiments may be determined based on a meta-data analysis of machine learning engine 261 output over time as time-dependent data is changed.

For instance, in some embodiments, the data analysis module may receive a number of data files containing metadata which identifies the files as originating from a specific source, being created at a specific time, day, or the like, and may package this data to be analyzed by the machine learning engine 261, as well as store the files in a catalog of data files in the data repository 256 or database 300 (e.g., files may be catalogued according to any metadata characteristic, including descriptive characteristics such as source, identity, time since creation, or the like, or including data characteristics such as file type, size, encryption type, or the like). The machine learning engine 261 and machine learning dataset(s) 262 may store instructions and/or data that cause or enable the intelligent detection system 200 to generate, in real-time and based on received information, new output in the form of prediction, current status, analysis, or the like of one or more communications, network activity data streams, or transaction patterns. In some embodiments, the machine learning engine 261 and machine learning dataset(s) 262 may store instructions and/or data that cause or enable the intelligent detection system 200 to determine, in real-time and based on received information, recommended actions or prophylactic actions to be taken to benefit one or more specific users or systems for their protection against an identified malfeasant attempt to collect information, access one or more user devices or accounts, or control one or more user devices or accounts.

The machine learning dataset(s) 262 may contain data queried from database 300 or may be extracted or received from third party systems 400, managing entity system 500, or the like, via network 101. The database 300 may also contain metadata, which may be generated at the time of data creation, onboarding to the managing entity system 500 or intelligent detection system 200, or in some cases may be generated specifically by the data analysis module 260. In some cases, the metadata may include statistics regarding each column of features in a dataset, which may be stored in a separate tabular dataset and tracked over a certain temporal period, such as a day, month, multi-month period, or the like, in order to provide the capability for meta-analysis on how data features affect modeling over time.

In some embodiments, the machine learning dataset(s) 262 may also contain data relating to user activity or device information, which may be stored in a user account managed by the managing entity system. In some embodiments, the machine learning engine 261 may be a single-layer recurrent neural network (RNN) which utilizes sequential models to achieve results in audio and textual domains. Additionally, the machine learning engine 261 may serve an alternate or dual purpose of analyzing user resource account history, user preferences, user interests, user device activity history, or other user submitted or gathered data from managing entity system 500, third party system 400, or the like, in order to generate predictions as to the statistical certainty that certain interactions, user device behavior, user communications, or the like, may be a malfeasant attempt to gain access or control one or more user devices or accounts. For instance, the machine learning engine may consist of a multilayer perceptron neural network, recurrent neural network, or a modular neural network designed to process input variables related to one or more user characteristics and output recommendations or predictions. Given the nature of the managing entity system 500, particularly in embodiments where the managing entity system 500 is a financial institution, the machine learning engine 261 may have a large dataset of user account information, resource transaction information, account resource amount information, communication information, data on known malfeasant actors, data on known patterns of malfeasant attempts to gain unauthorized access, or the like, from which to draw from and discern specific patterns or correlations in device behavior, network communications between devices, or the like. It is understood that such data may be anonymized or completely stripped of personal identifying characteristics of specific users in preferred embodiments, with no negative impact the system's ability to generate accurate output or prediction data given certain variables.

For instance, the true identity of user X is not a necessary data point in determining that user X is currently being solicited by known malfeasant user Y (e.g., or by some communication style, user device interaction, request for access, or the like, which fits the pattern of known malfeasant user Y) in order to gain access or control of their user device or accounts. For instance, in some embodiments, a malfeasant actor may be identified as implementing an emulated communication designed to fool users into thinking that the communication is a legitimate outreach from their financial institution, such as managing entity system 500. In such instances, the communication may request the user to perform certain user device activities which grant or allow user device permissions, access, or account permissions, access, or the like, to the malfeasant user under the guise of a fabricated security concern. For example, the malfeasant user or unauthorized user may alert the user of a fake or fabricated "security issue" requiring that the user grant the malfeasant user remote access or remote control permissions on the user device of the user as a solution approach, to apply "security patches," or the like. In some embodiments, the malfeasant user may instead request access to one or more resource accounts, enterprise accounts, or the like, to allow the malfeasant user, posing as a legitimate security professional or administrator, to access those accounts and the data stored therein. In these instances, the intelligent detection system may analyze patterns in the mode or channel of communication, the substance of the communication, the source of the communication, or the nature of the requested device access permissions in order to identify these malfeasant requests for access or control of the user device or accounts, and proactively thwart the transfer of control or permissions, or separately alert the user of the malfeasant attempt before permission, access, or control over sensitive device permissions or user data are granted.

In further embodiments, the machine learning engine 261 may have a large dataset of user account information, user communication pattern information, resource transaction information, account resource amount information, account access information, user authorization information, situational data, or the like, from which to draw from and discern specific patterns or correlations related to account security, system security, or the like. For instance, the machine learning engine 261 may be trained on a large dataset of confirmed malfeasant transactions or transaction attempts in order to identity relevant patterns and characteristics associated with certain malfeasant users, communication channels, communications themselves (e.g., originating domain, phone numbers, email addresses, IP addresses, preferred method of outreach such as text, email, phone call, or the like, or requested network ports required for remote access to take place, or the like), which may be correlated with a probability of malfeasant activity. In these situations, responsive measures taken to further investigate communications with a high degree of probability for malfeasance may be key in reducing potential data exposure. As such, it is imperative that the machine learning engine 261 operate in an accurate and predictable manner, and the model must have the capability to dynamically adapt over time in response to changing data characteristics. However, if one feature set of the incoming data stream is skewing the output of the machine learning engine 261, it is necessary for the system to discern if the skew is natural or otherwise perhaps an intentionally levied method against the system in order to train the model to react to patterns or characteristics in a certain way. In such situations, the analysis of metadata in conjunction with machine learning output in order to identify feature sets which have the highest degree of impact on machine learning output over time may be most crucial, and the machine learning mode may need to be adjusted accordingly.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the intelligent detection system 200, the user device 104, other processing systems, data systems, etc. Additionally, the processing device 242 may generally refer to a device or combination of devices having circuitry used for implementing the communication and/or logic functions of the intelligent detection system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the intelligent detection system 200 may be allocated between these processing devices according to their respective capabilities. The processing device 242 may further include functionality to operate one or more software programs based on computer-executable program code 252 thereof, which may be stored in a memory device 250, such as the processing system application 254 and the pattern recognition module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the intelligent detection system 200 may generally refer to a device or combination of devices that store one or more forms of computer-readable media for storing data and/or computer-executable program code/instructions. For example, the memory device 250 may include any computer memory that provides an actual or virtual space to temporarily, or permanently, store data and/or commands provided to the processing device 242 when it carries out its functions described herein.

Figure 3:
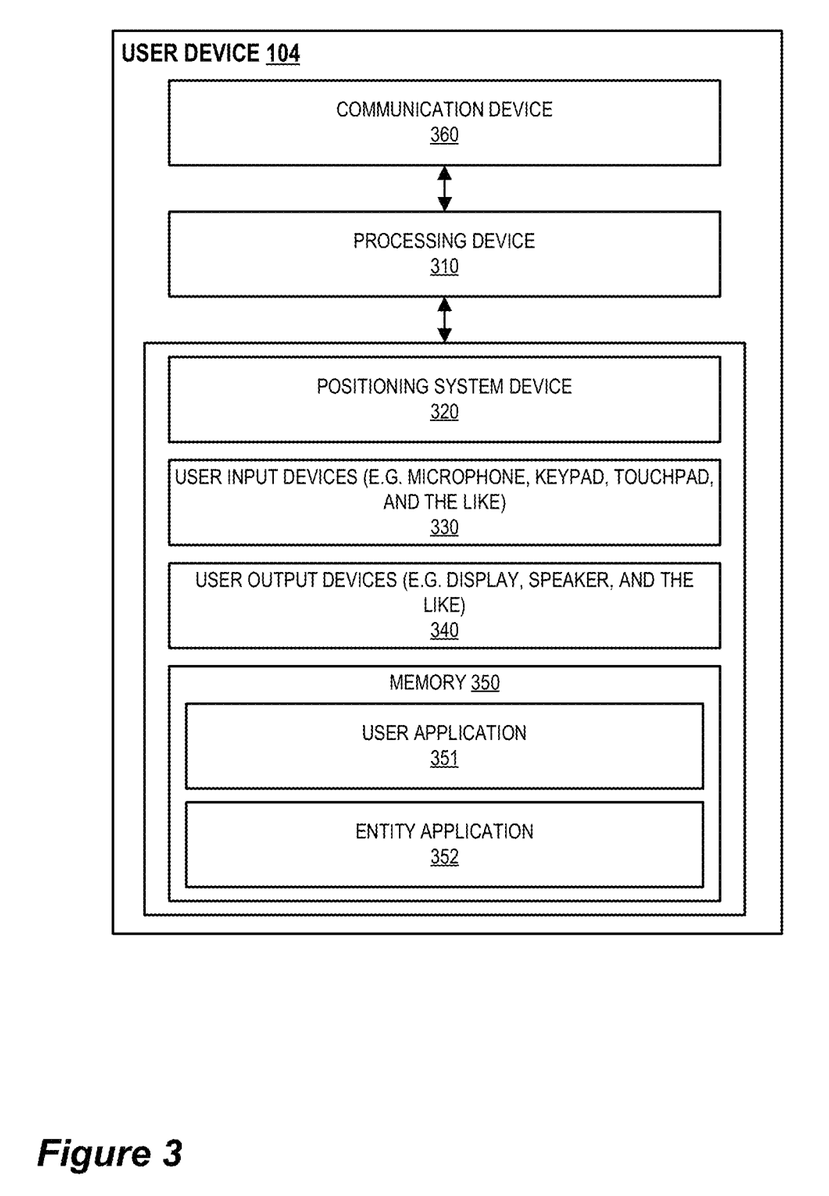
FIG. 3 is a block diagram illustrating a user device associated with the intelligent detection system, in accordance with one embodiment of the present disclosure.

FIG. 3 is a block diagram illustrating a user device associated with the intelligent detection system, in accordance with one embodiment of the present disclosure. The user device 104 may include a user mobile device, desktop computer, laptop computer, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices. The user device 104 may generally include a processing device or processor 310 communicably coupled to devices such as, a memory device 350, user output devices 340 (for example, a user display or a \speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, an entity application 352, or a web browser application. The user application 351 or the entity application may then allow the user device 104 to transmit and receive data and instructions to or from the third party system 400, intelligent detection system 200, and the managing entity system 500, and display received information via the user interface of the user device 104. The user application 351 may further allow the user device 104 to transmit and receive data to or from the managing entity system 500 data and instructions to or from the intelligent detection system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the intelligent detection system 200 may be accessed by multiple different entities, it may be configured to present information according to the preferences or overall common themes or branding of each entity system of third party system. In this way, each system accessing the intelligent detection system 200 may use a unique aesthetic for the entity application 352 or user application 351 portal.

The processor 310 may be configured to use the communication device 360 to communicate with one or more devices on a network 101 such as, but not limited to the third party system 400, the intelligent detection system 200, and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker or other audio device, which are operatively coupled to the processor 310 and allow the user device to output generated audio received from the intelligent detection system 200. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 350 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the intelligent detection system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
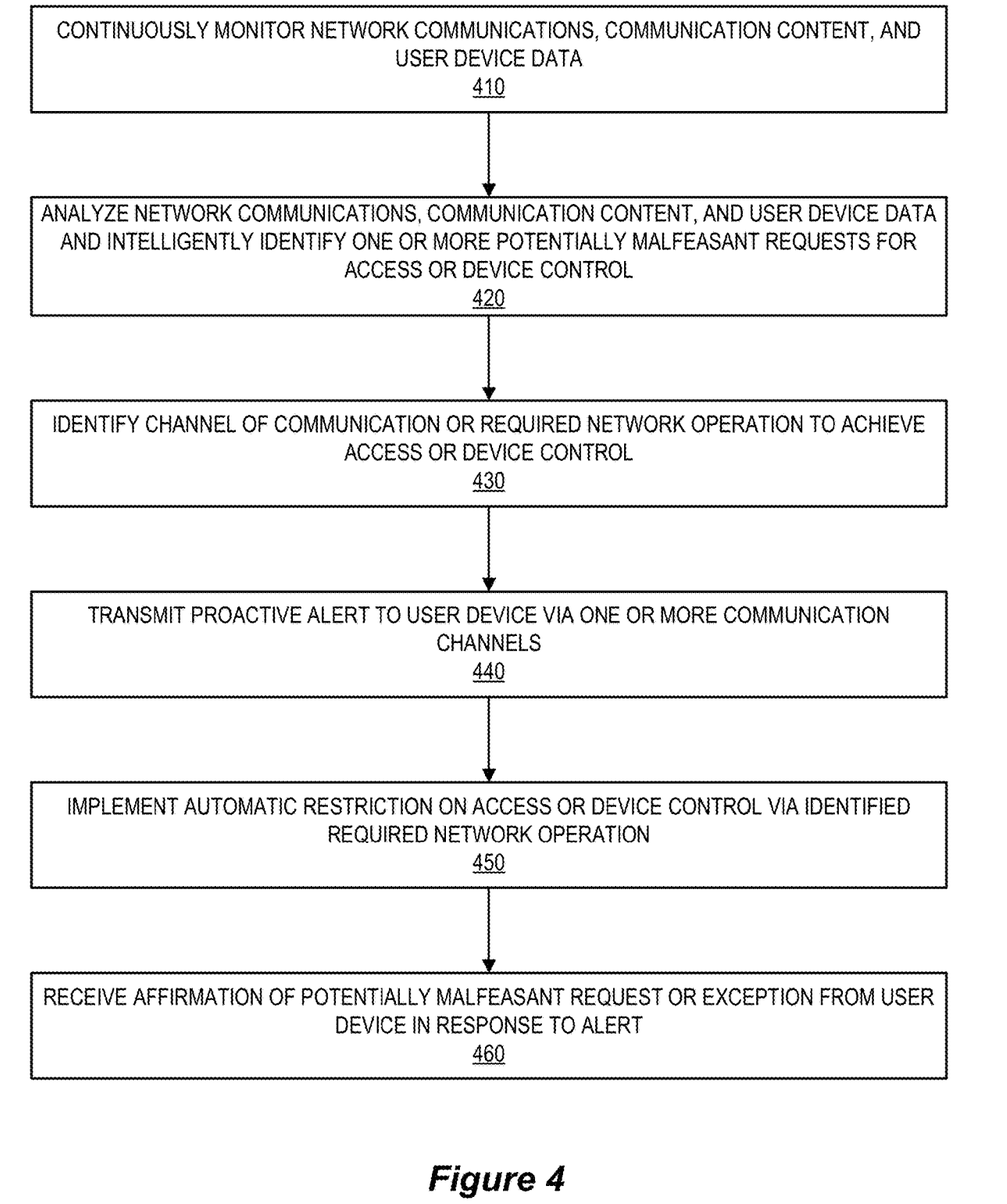
FIG. 4 is a flow diagram illustrating a process for identifying and proactively securing against malfeasant data collection or device control, in accordance with one embodiment of the present disclosure.

FIG. 4 is a flow diagram illustrating a process for identifying and proactively securing against malfeasant data collection or device control, in accordance with one embodiment of the present disclosure. With the understanding that it may be a common technique for unauthorized users to emulate a security issue or account vulnerability and "proactively reach out" to one or more users in order to gain unauthorized access via remote device control or account access, the system is designed to identify and proactively secure against such methods. In some embodiments, a malfeasant or unauthorized user will ask the user to provide sensitive information so that they can address a fabricated issue. In some instances, the unauthorized user will actually ask the user to allow the unauthorized or malfeasant party to create a remote session on their device and allow control of their machine via remote session(s). The present invention specifically focuses on ways in which to identify that a user is being solicited using one of these methods and reach out to the user to notify them that they may be in the process of being compromised depending on the actions they choose to take and the permissions they grant to third parties. The system will analyze incoming network traffic in order to recognize patterns that reveal when a malfeasant actor is logging in from a customer device or computer remotely, and proactively block these attempts, lock the user's account, and notify the user of the activity. The system will react immediately as the malfeasant actor initiates a remote session by capturing device ID, IP address, browser information, or the like, and analyzing this information in order to deduce information patterns which can be used to further indicate or identify these unauthorized remote sessions.

As shown in FIG. 4, the process begins whereby the system continuously monitors network communications, communication content, and user device data, indicated in block 410. In some embodiments, the system may monitor network communications between user device 104 and managing entity system 500, specifically. For example, the system may monitor incoming network activity from user device 104 and analyze it alongside the user accounts, secure sessions, or the like which are requested from managing entity system 500 in order to identify that an unrecognized IP address, device type, or geolocation is originating the connection request to managing entity system 500 services. For instance, if a session established from user device 104 accesses an account 1 of user 1, but any of the network characteristics indicate that the traffic is coming from an unknown location, the system may flag this session as potentially compromised.

As shown in block 420, the system may analyze network communications, communication content, and user device data, and intelligently identify one or more potentially malfeasant requests for access or device control. In some embodiments, the incoming and outgoing network connections on user device 104 itself may be analyzed in order to determine remote device control sessions, remote session requests, or the like. For example, certain network channels may be monitored specifically in the incoming and outgoing traffic data packets in order to determine network communication characteristics of data transmitted to or from user device 104 that may indicate a remote device session being initiated or requested. Depending on the embodiment of the invention, this may include any number of TCP/IP ports, originating IP address of certain devices, or the like. For example, in certain operating environments, TCP port 3389 and UDP port 3389 may be designated as listening ports for the user device 104 to establish remote device control sessions with third parties. As such, in this exemplary embodiment, network traffic to and from user device 104 which utilize TCP port 3389 and UDP port 3389 may be flagged for further review or proactive security action.

In still further embodiments, the system may have access to certain communications transmitted to or from user device 104 (e.g., the user device is an enterprise device issued to the user for work purposes, and may be monitored for security purposes, with the user's consent, or the like). In some instances where there is probable reason to suspect that the user is initiating a remote device session or receiving a remote device session request from a third party, the system may intelligently analyze recent communications on multiple channels or modes of communication in order to corroborate the suspected request for remote device access. In such instances, communications such as email, internet-enabled phone calls, or voice-over-IP (VoIP), instant messages on the user device operating system, or the like, may be parsed and analyzed in an anonymized fashion (e.g., wherein the user identity is stripped from viewable data, or the like), in order to specifically identify known phrasing, third party device information, third party identity, or the like, which is known to be associated with attempted malfeasant requests for remote device control or account access. In this way, combined with the network traffic analysis, the system may identify the channel of communication or required network operation to achieve the requested access or device control via the third party, as shown in block 430.

Next, as shown in block 440, the system may transmit a proactive alert to the user device 104 via one or more communication channel(s). For instance, the system may identify that the user device 104 was contacted via email by a malfeasant third party, and a remote session on the user device has been requested or may be in the process of being initiated. The system may issue an alert proactively in the same communication channel, such as email or other communication channel, to notify the user that they are likely being subjected to a false or malfeasant request for device access under the guise of a legitimate security issue. For instance, if the system analyzes incoming and outgoing network traffic on the user device 104 and determines that a remote session is being requested, or if the system recognizes that system services or applications are being accessed under a user account using an unrecognized device, the system may then analyze communications associated with the user device, user account, or the like, in order to identify any corroborating evidence that the user device 104 is the subject of a malfeasant attempt for access or control.

In some embodiments, after the system has determined a likelihood that the user device 104 is currently being actively controlled via a remote session, or if the user device 104 is receiving requests or communications related to remote device control or account connectivity, the system may implement an automatic temporary restriction on access or device control via an identified required network operation, as shown in block 450. For instance, in some embodiments, the user device 104 may be the subject of a mobile device management tool used by the managing entity system 500 to manage device connectivity and security, and the system may be able to restrict the user device 104 network communications in order to block necessary network operation required for remote device connectivity or control (e.g., by blocking necessary network ports, application usage, or the like). In other embodiments, the system may temporarily block the user device from any network connectivity to critical system or account services, such as logging on to a managing entity application portal, account portal, or utilizing one or more applications located on the user device 104 in order to limit the access to certain sensitive information in the event that a remote session may already be initiated or authorized by the user.

In some embodiments, the user may respond to the proactive alert in order to affirm that they have received a malfeasant request for remote device control, or to request an exception, as shown in block 460. For instance, in some embodiments, it is feasible that a legitimate, secure request for remote device control or account access may be initiated from a device that the managing entity system 500 has not been updated to recognize fully. In such instances, the user may need some recourse to request an exception for remote device control or access. In these instances, the system may forward the user request for exception to a system administrator or third party system device in order to review the request and determine a necessary course of action, or if any follow-up information is required before making a determination.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for proactive protection against unauthorized device control, the system comprising:
   a memory device; and
   a processing device operatively coupled to the memory device, wherein the processing device is configured to execute computer-readable program code to:
      continuously monitor network activity to and from a user device and user device communication data;
      analyze network activity to and from the user device and user device communication data and identify one or more requests or indications of user device remote control;
      transmit a proactive alert to the user device via one or more communication channels;
      automatically implement a temporary restriction on user device network connectivity or service access capability in response to identifying the one or more requests or indications of user device remote control;
      based on identifying one or more requests or indications of user device remote control, analyze communications received by the user device;
      identify one or more corroborating communications related to the identified one or more requests or indications of user device remote control; and
      receive an affirmation or exception request from the user device.

2. The system of claim 1, wherein the proactive alert to the user device is transmitted using the same communication channel as the one or more corroborating communications related to the identified one or more requests or indications of user device remote control.

3. The system of claim 1, wherein the one or more requests or indications of user device remote control are identified based on analyzing TCP/IP port number of network traffic to or from the user device.

4. The system of claim 1, further configured to identify the one or more requests or indications of user device remote control by identifying one or more user accounts or secure applications accessed from an unrecognized device or network address.

5. The system of claim 1, further configured to transmit the exception request automatically to a network administrator prior to reversing or removing the temporary restriction.

6. The system of claim 1, wherein the proactive alert is transmitted to the user device using more than one communication channel at a time.

7. A computer program product for proactive protection against unauthorized device control, the computer program product comprising at least one non-transitory computer readable medium comprising computer readable instructions, the instructions comprising instructions for:

continuously monitoring network activity to and from a user device and user device communication data;

analyzing network activity to and from the user device and user device communication data and identifying one or more requests or indications of user device remote control;

transmitting a proactive alert to the user device via one or more communication channels;

automatically implementing a temporary restriction on user device network connectivity or service access capability in response to identifying the one or more requests or indications of user device remote control;

based on identifying one or more requests or indications of user device remote control, analyzing communications received by the user device;

identifying one or more corroborating communications related to the identified one or more requests or indications of user device remote control; and     receiving an affirmation or exception request from the user device.

8. The computer program product of claim 7, wherein the proactive alert to the user device is transmitted using the same communication channel as the one or more corroborating communications related to the identified one or more requests or indications of user device remote control.

9. The computer program product of claim 7, wherein the one or more requests or indications of user device remote control are identified based on analyzing TCP/IP port number of network traffic to or from the user device.

10. The computer program product of claim 7, further comprising instructions for:

identifying the one or more requests or indications of user device remote control by identifying one or more user accounts or secure applications accessed from an unrecognized device or network address.

11. The computer program product of claim 7, further comprising instructions for:

transmitting the exception request automatically to a network administrator prior to reversing or removing the temporary restriction.

12. The computer program product of claim 7, wherein the proactive alert is transmitted to the user device using more than one communication channel at a time.

13. A computer implemented method for proactive protection against unauthorized device control, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

continuously monitoring network activity to and from a user device and user device communication data;

analyzing network activity to and from the user device and user device communication data and identifying one or more requests or indications of user device remote control;

transmitting a proactive alert to the user device via one or more communication channels;

automatically implementing a temporary restriction on user device network connectivity or service access capability in response to identifying the one or more requests or indications of user device remote control;

based on identifying one or more requests or indications of user device remote control, analyzing communications received by the user device;

identifying one or more corroborating communications related to the identified one or more requests or indications of user device remote control; and     receiving an affirmation or exception request from the user device.

14. The computer implemented method of claim 13, wherein the proactive alert to the user device is transmitted using the same communication channel as the one or more corroborating communications related to the identified one or more requests or indications of user device remote control.

15. The computer implemented method of claim 13, wherein the one or more requests or indications of user device remote control are identified based on analyzing TCP/IP port number of network traffic to or from the user device.

16. The computer implemented method of claim 13, further comprising identifying the one or more requests or indications of user device remote control by identifying one or more user accounts or secure applications accessed from an unrecognized device or network address.

17. The computer implemented method of claim 13, further comprising transmitting the exception request automatically to a network administrator prior to reversing or removing the temporary restriction.

\* \* \* \* \*